US012089312B2

(12) United States Patent
Wakuda

(10) Patent No.: US 12,089,312 B2
(45) Date of Patent: Sep. 10, 2024

(54) ILLUMINATION CONTROL APPARATUS, ILLUMINATION CONTROL METHOD, AND COMPUTER READABLE RECORDING MEDIUM

(71) Applicant: Roland Corporation, Shizuoka (JP)

(72) Inventor: Satoshi Wakuda, Shizuoka (JP)

(73) Assignee: Roland Corporation, Shizuoka (JP)

( * ) Notice: Subject to any disclaimer, the term of this patent is extended or adjusted under 35 U.S.C. 154(b) by 374 days.

(21) Appl. No.: 17/551,115

(22) Filed: Dec. 14, 2021

(65) Prior Publication Data

US 2022/0201824 A1 Jun. 23, 2022

(30) Foreign Application Priority Data

Dec. 23, 2020 (JP) ................................ 2020-214201
Jan. 11, 2021 (JP) ................................ 2021-002493

(51) Int. Cl.
*H05B 47/155* (2020.01)

(52) U.S. Cl.
CPC ................................ *H05B 47/155* (2020.01)

(58) Field of Classification Search
CPC ............................ H05B 47/105; H05B 47/155
See application file for complete search history.

(56) References Cited

U.S. PATENT DOCUMENTS 6,611,297 B1 * 8/2003 Akashi .................. H05B 47/10 348/739
10,568,179 B2 * 2/2020 Anthony ............. H05B 47/155
2011/0109228 A1 * 5/2011 Shimomura ......... H05B 47/185 315/185 R
2017/0223801 A1 * 8/2017 Gan .................... G06F 3/04886
2017/0367166 A1 * 12/2017 Ihara .................. H04L 61/5038
2018/0092193 A1 * 3/2018 Hidaka ................ G06F 3/0482

FOREIGN PATENT DOCUMENTS

JP H02253503 10/1990
JP 2000173783 6/2000
JP 2008235122 10/2008
JP 2016181454 10/2016
JP 2017224502 12/2017

OTHER PUBLICATIONS

Machine Translation of JP2008-235122A (Year: 2008).*

* cited by examiner

*Primary Examiner* — Alexander H Taningco
*Assistant Examiner* — Pedro C Fernandez
(74) *Attorney, Agent, or Firm* — JCIPRNET

(57) ABSTRACT

An illumination control apparatus, an illumination control method, and a computer readable recording medium that records an illumination control program are provided. The illumination control apparatus includes: a start position storage section that stores start positions of the sets of illumination control values in a control signal, created by a signal creation section, including a plurality of sets of illumination control values for controlling illumination; and a start position output section that outputs the start positions stored in the start position storage section in a manner that the start positions can be set for the illumination devices, in which the illumination devices are configured to be able to control conditions of the illumination on the basis of the sets of illumination control values in the control signal transmitted by a signal transmission section by setting the start positions output by the start position output section for the illumination devices.

19 Claims, 10 Drawing Sheets

ILLUMINATION CONTROL DATA 11b

| DISPOSITION POSITION | CONTROL TYPE | START ADDRESS | NUMBER OF BYTES | ILLUMINATION CONTROL VALUES | | | | | |
|---|---|---|---|---|---|---|---|---|---|
| | | | | FIRST BYTE | SECOND BYTE | THIRD BYTE | FOURTH BYTE | FIFTH BYTE | . . . |
| ENTIRE | RGB | 0 | 3 | 81 | 216 | 154 | – | – | . . . |
| | RGBM | 3 | 4 | 81 | 216 | 154 | 49 | – | . . . |
| | MRGB | 7 | 4 | 49 | 81 | 216 | 154 | – | . . . |
| | RGBAM | 11 | 5 | 81 | 216 | 154 | 169 | 49 | . . . |
| | : | : | : | : | : | : | : | : | : |
| | WRGB | 95 | 4 | 49 | 81 | 216 | 154 | – | . . . |
| UP | RGB | 101 | 3 | 44 | 55 | 244 | – | – | . . . |
| | RGBM | 104 | 4 | 44 | 55 | 244 | 205 | – | . . . |
| | MRGB | 108 | 4 | 205 | 44 | 55 | 244 | – | . . . |
| | RGBAM | 112 | 5 | 44 | 55 | 244 | 17 | 205 | . . . |
| | : | : | : | : | : | : | : | : | : |
| DOWN | RGB | 202 | 3 | 140 | 177 | 233 | | – | . . . |
| | RGBM | 205 | 4 | 140 | 177 | 233 | 72 | – | . . . |
| | MRGB | 209 | 4 | 72 | 140 | 177 | 233 | – | . . . |
| | RGBAM | 213 | 5 | 140 | 177 | 233 | 93 | 72 | . . . |
| | : | : | : | : | : | : | : | : | : |
| LEFT | RGB | 303 | 3 | 162 | 175 | 51 | – | – | . . . |
| | RGBM | 306 | 4 | 162 | 175 | 51 | 173 | – | . . . |
| | MRGB | 310 | 4 | 173 | 162 | 175 | 51 | – | . . . |
| | RGBAM | 314 | 5 | 162 | 175 | 51 | 33 | 173 | . . . |
| | : | : | : | : | : | : | : | : | : |
| RIGHT | RGB | 404 | 3 | 111 | 143 | 190 | – | – | . . . |
| | RGBM | 407 | 4 | 111 | 143 | 190 | 125 | – | . . . |
| | MRGB | 411 | 4 | 125 | 111 | 143 | 190 | – | . . . |
| | RGBAM | 415 | 5 | 111 | 143 | 190 | 26 | 125 | . . . |
| | : | : | : | : | : | : | : | : | : |
| | WRGB | 499 | 4 | 125 | 111 | 143 | 190 | – | . . . |

ILLUMINATION CONTROL DATA 11b

| DISPOSITION POSITION | CONTROL TYPE | START ADDRESS | NUMBER OF BYTES | ILLUMINATION CONTROL VALUES | | | | | |
|---|---|---|---|---|---|---|---|---|---|
| | | | | FIRST BYTE | SECOND BYTE | THIRD BYTE | FOURTH BYTE | FIFTH BYTE | • • • |
| ENTIRE | RGB | 0 | 3 | 81 | 216 | 154 | – | – | • • • |
| | RGBM | 3 | 4 | 81 | 216 | 154 | 49 | – | • • • |
| | MRGB | 7 | 4 | 49 | 81 | 216 | 154 | – | • • • |
| | RGBAM | 11 | 5 | 81 | 216 | 154 | 169 | 49 | • • • |
| | : | : | : | : | : | : | : | : | : |
| | WRGB | 95 | 4 | 49 | 81 | 216 | 154 | – | • • • |
| UP | RGB | 101 | 3 | 44 | 55 | 244 | – | – | • • • |
| | RGBM | 104 | 4 | 44 | 55 | 244 | 205 | – | • • • |
| | MRGB | 108 | 4 | 205 | 44 | 55 | 244 | – | • • • |
| | RGBAM | 112 | 5 | 44 | 55 | 244 | 17 | 205 | • • • |
| | : | : | : | : | : | : | : | : | : |
| DOWN | RGB | 202 | 3 | 140 | 177 | 233 | – | – | • • • |
| | RGBM | 205 | 4 | 140 | 177 | 233 | 72 | – | • • • |
| | MRGB | 209 | 4 | 72 | 140 | 177 | 233 | – | • • • |
| | RGBAM | 213 | 5 | 140 | 177 | 233 | 93 | 72 | • • • |
| | : | : | : | : | : | : | : | : | : |
| LEFT | RGB | 303 | 3 | 162 | 175 | 51 | – | – | • • • |
| | RGBM | 306 | 4 | 162 | 175 | 51 | 173 | – | • • • |
| | MRGB | 310 | 4 | 173 | 162 | 175 | 51 | – | • • • |
| | RGBAM | 314 | 5 | 162 | 175 | 51 | 33 | 173 | • • • |
| | : | : | : | : | : | : | : | : | : |
| RIGHT | RGB | 404 | 3 | 111 | 143 | 190 | – | – | • • • |
| | RGBM | 407 | 4 | 111 | 143 | 190 | 125 | – | • • • |
| | MRGB | 411 | 4 | 125 | 111 | 143 | 190 | – | • • • |
| | RGBAM | 415 | 5 | 111 | 143 | 190 | 26 | 125 | • • • |
| | : | : | : | : | : | : | : | : | : |
| | WRGB | 499 | 4 | 125 | 111 | 143 | 190 | – | • • • |

FIG. 4

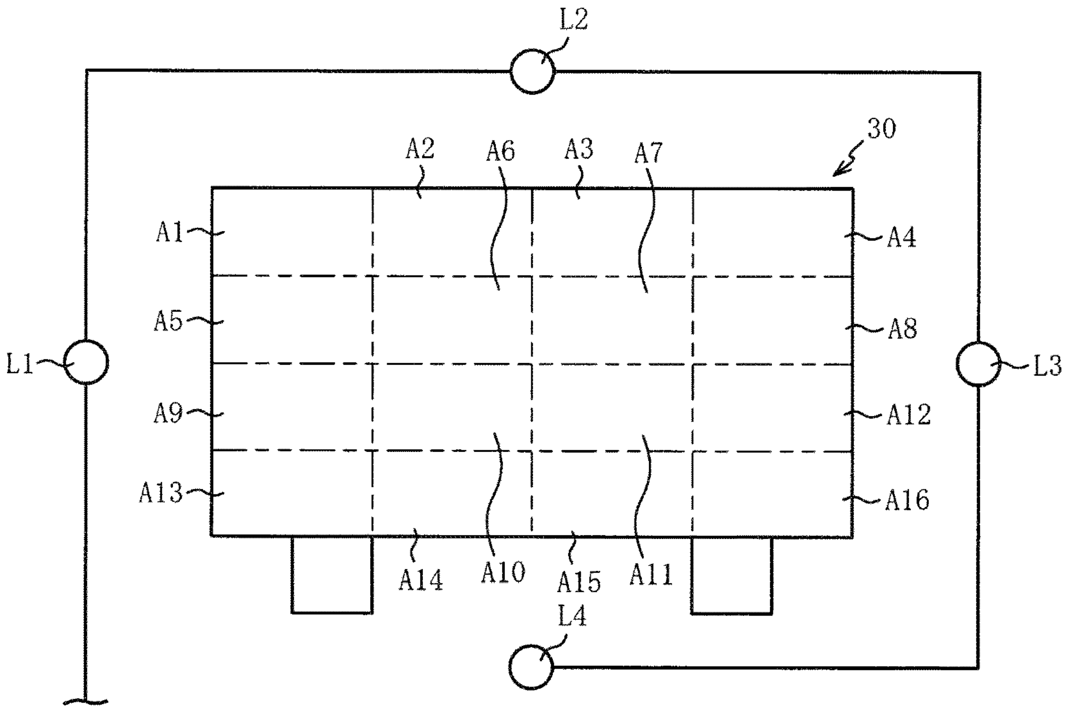
(a)
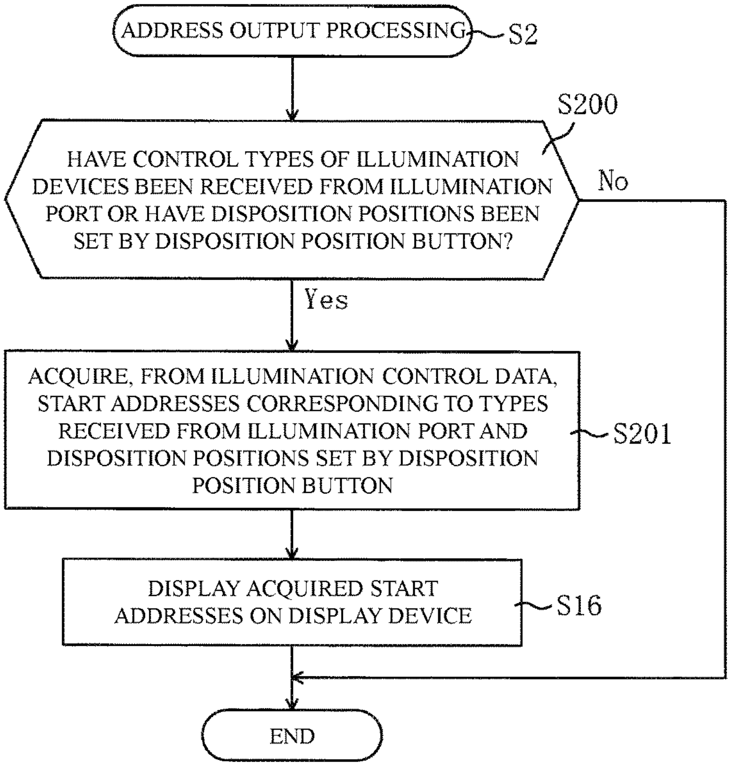
(b)
FIG. 10

ILLUMINATION CONTROL APPARATUS, ILLUMINATION CONTROL METHOD, AND COMPUTER READABLE RECORDING MEDIUM

CROSS-REFERENCE TO RELATED APPLICATION

This application claims the priority benefits of Japanese application no. 2020-214201, filed on Dec. 23, 2020 and Japanese application no. 2021-002493, filed on Jan. 11, 2021. The entirety of each of the above-mentioned patent applications is hereby incorporated by reference herein and made a part of this specification.

BACKGROUND

Technical Field

The present disclosure relates to an illumination control apparatus, an illumination control method, and a computer readable recording medium that records an illumination control program.

Description of Related Art

Patent Document 1 discloses an illumination control apparatus that controls illumination conditions of an illumination device by outputting a control signal in which sets of illumination control values for controlling the illumination conditions are stored to the illumination device. Specifically, a plurality of illumination devices is connected to the illumination control apparatus, and a control signal in which sets of illumination control values for all the illumination devices to be controlled are stored is transmitted to each illumination device. The illumination devices acquire the set of illumination control values adapted to the illumination devices themselves from the received control signal and control the illumination conditions.

PATENT DOCUMENTS

[Patent Document 1] Japanese Patent Laid-Open No. 2016-181454 (Paragraph 0017 and FIG. 1, for example).

Incidentally, since the set of illumination control values for the plurality of illumination devices that is a target of control is stored in the control signal, it is necessary for the illumination devices to acquire the illumination control values adapted to the illumination devices themselves from the received control signal. At the same time, it is necessary for the illumination control apparatus to store the set of illumination control values adapted to each illumination device in a distinguished manner in the control signal.

Thus, an address where the set of illumination control values for each illumination device is stored is set first for each combination of the illumination control apparatus and each illumination device. Then, the illumination control apparatus stores each set of the corresponding illumination control values of the illumination devices on the basis of each set address and creates a control signal. The illumination device can acquire an illumination control value adapted to the illumination device itself with reference to the control signal received from the illumination control apparatus using the address set for the illumination device itself.

However, such a scheme has a problem that it is necessary for an operator to set corresponding addresses for all combinations of the illumination control apparatus and the illumination devices in advance and the setting procedure is complicated.

SUMMARY

The disclosure was made in order to solve the aforementioned problem and provides an illumination control apparatus, an illumination control method, and an illumination control program capable of reducing time and effort of setting addresses.

In order to achieve the object, according to an embodiment, there is provided an illumination control apparatus including a signal creation section that creates a control signal including a plurality of sets of illumination control values for controlling illumination and a signal transmission section that transmits the control signal created by the signal creation section to one or a plurality of illumination devices, the illumination control apparatus including: a start position storage section that stores start positions of the sets of illumination control values in the control signal created by the signal creation section; and a start position output section that outputs the start positions stored in the start position storage section in a manner that the start positions can be set for the illumination devices, in which the illumination devices are configured to be able to control conditions of the illumination on the basis of the sets of illumination control values in the control signal transmitted by the signal transmission section by setting the start positions output by the start position output section for the illumination devices.

In order to achieve the object, according to an embodiment, there is provided an illumination control method including: creating a control signal including a plurality of sets of illumination control values for controlling illumination; and transmitting the created control signal to one or a plurality of illumination devices, in which start positions of the sets of illumination control values in the created control signal are determined in advance in association with control types, which are types of the illumination control values.

According to an embodiment, there is provided a computer readable recording medium that records an illumination control program for causing a computer including a storage section to execute illumination control processing, the illumination control program causing the computer to execute a signal creating step of creating a control signal including a plurality of sets of illumination control values for controlling illumination and a signal transmitting step of transmitting the control signal created in the signal creating step to a plurality of illumination devices, the illumination control program is configured to: cause the storage section to function as a start position storage section that stores start positions of the sets of illumination control values in the control signal created in the signal creating step; cause the computer to execute a start position outputting step of the start positions stored in the start position storage section in a manner that the start positions are able to be set for the illumination devices, and the illumination devices are configured to be able to control conditions of the illumination on the basis of the illumination control values in the control signals transmitted in the signal transmitting step by causing the illumination devices to set the start positions output in the start position outputting step.

BRIEF DESCRIPTION OF THE DRAWINGS

FIG. 4 is a diagram schematically illustrating illumination control data.

Figure 5:
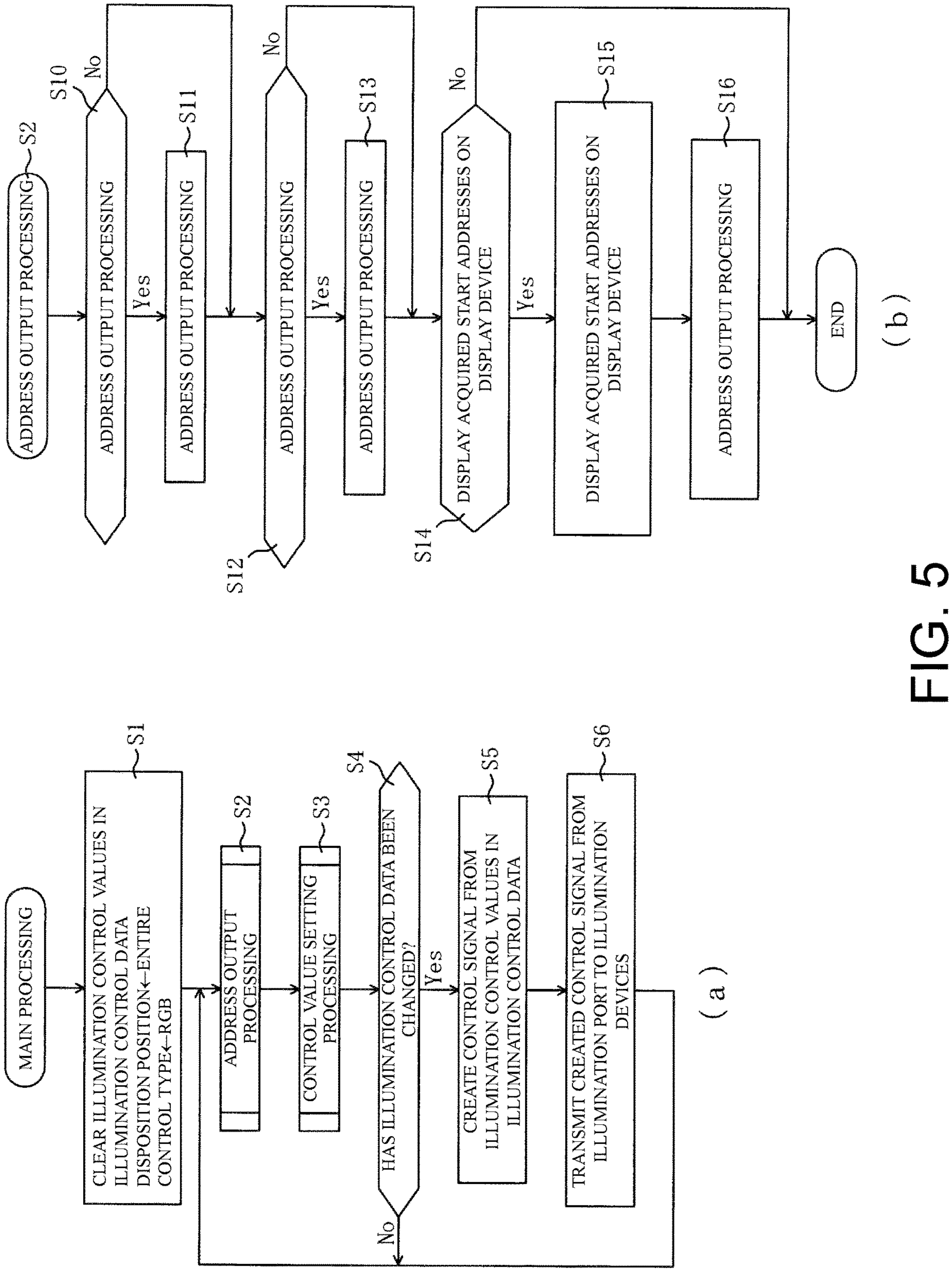

(a) of FIG. 5 is a flowchart of main processing, and (b) of FIG. 5 is a flowchart of address output processing.

Figure 6:
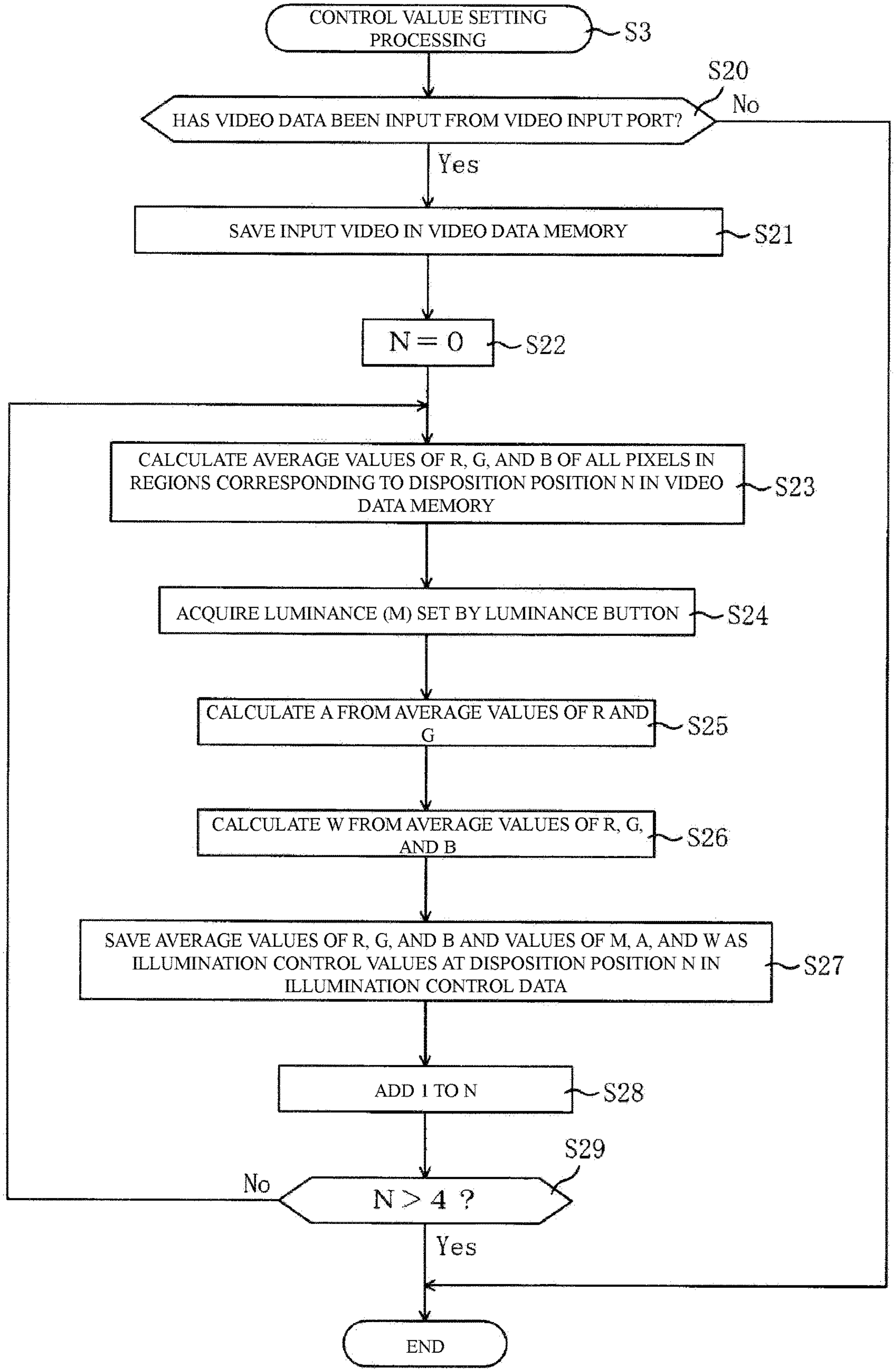

FIG. 6 is a flowchart of control value setting processing.

Figure 7:
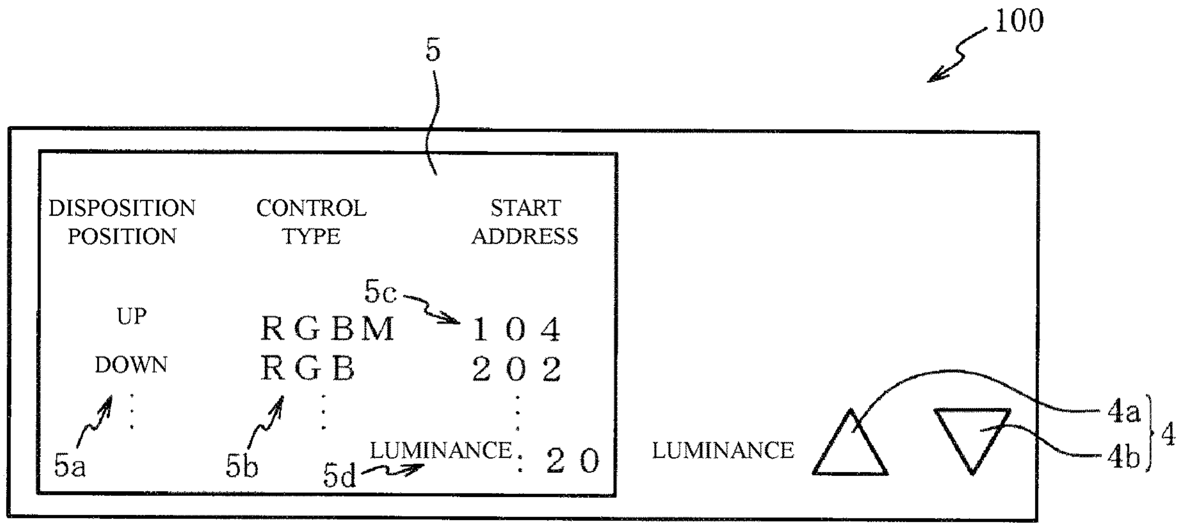

FIG. 7 is an exterior view of an illumination control apparatus according to a second embodiment.

Figure 8:
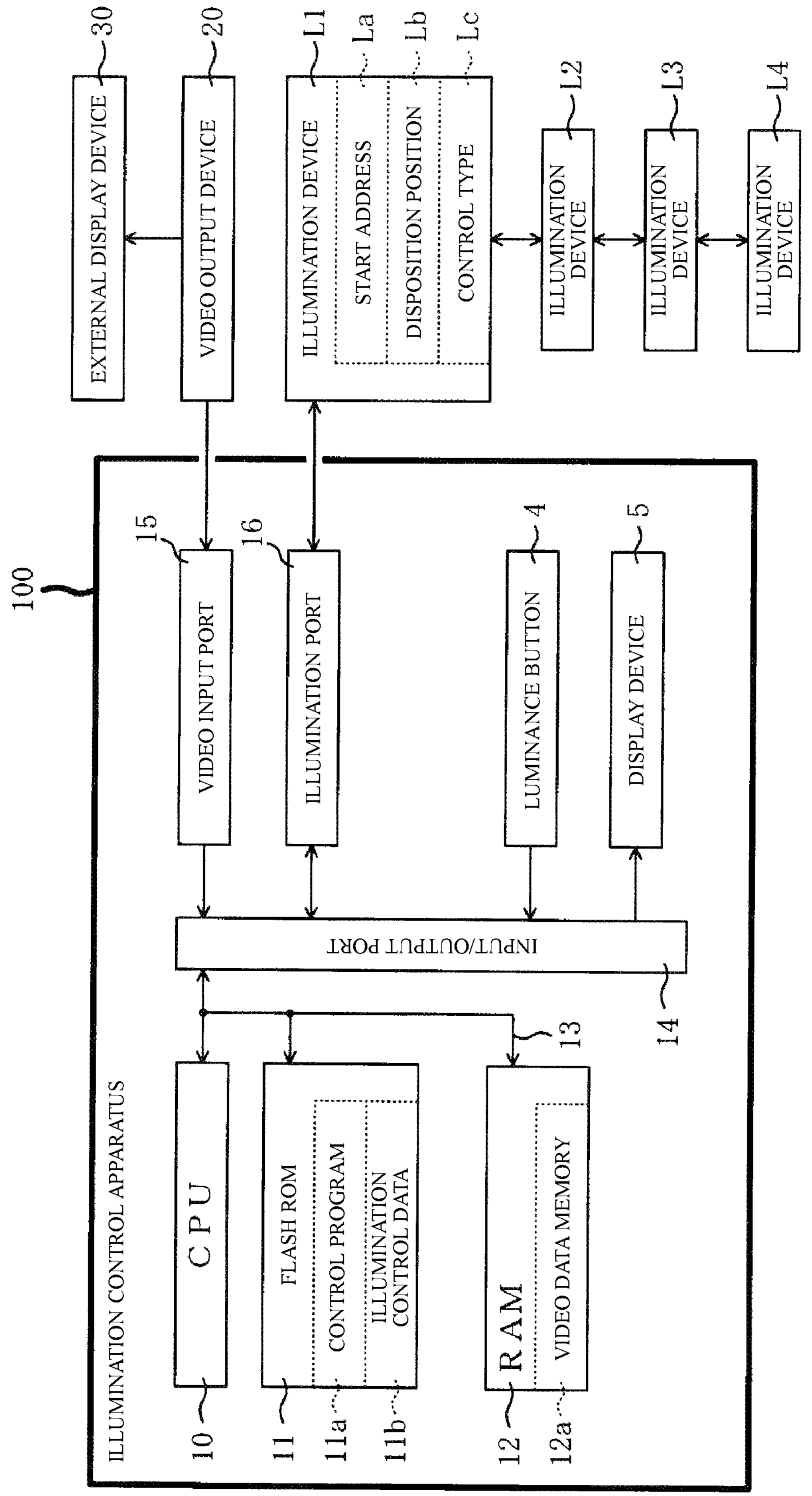

FIG. 8 is a block diagram illustrating an electrical configuration of the illumination control apparatus according to the second embodiment.

Figure 9:
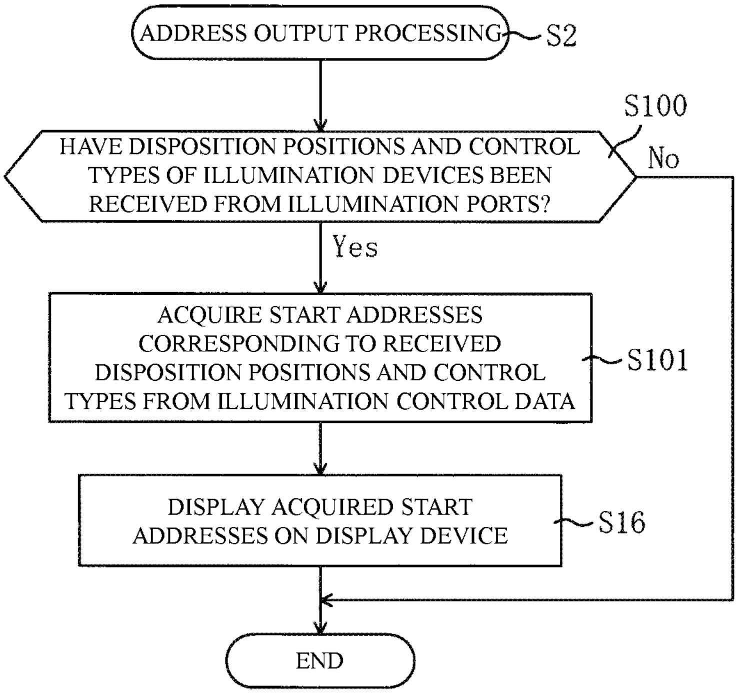

FIG. 9 is a flowchart of address output processing according to the second embodiment.

(a) of FIG. 10 is a diagram showing splitting of a video according to a modification example, and (b) of FIG. 10 is a flowchart of address output processing according to the modification example.

DESCRIPTION OF THE EMBODIMENTS

Figure 1:
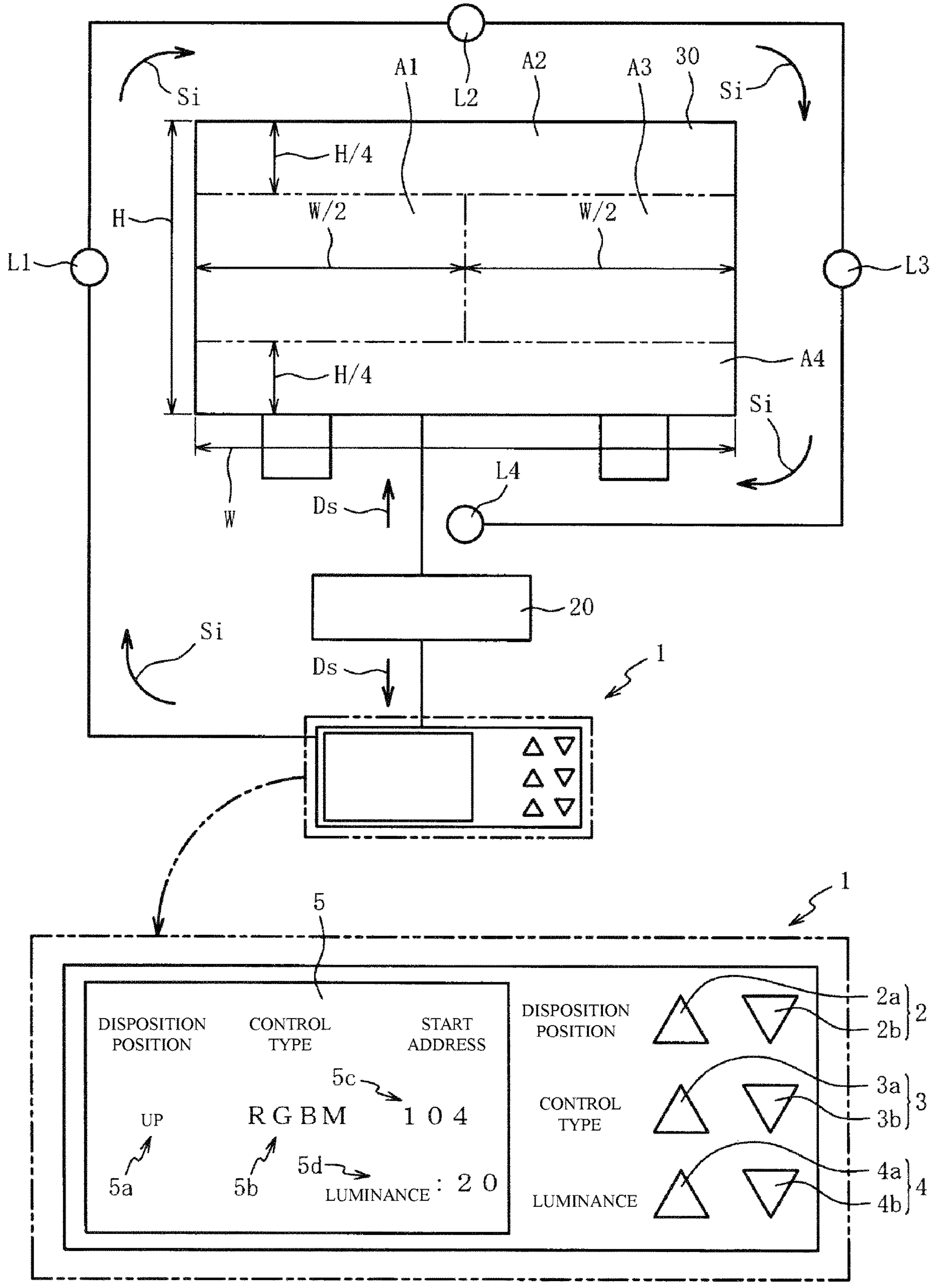
FIG. 1 is an exterior view of an illumination control apparatus according to an embodiment.

Hereinafter, preferred embodiments will be described with reference to the accompanying drawings. An outline of an illumination control apparatus 1 according to the present embodiment will be described with reference to FIG. 1. FIG. 1 is an exterior view of the illumination control apparatus 1. The illumination control apparatus 1 is an apparatus that controls illumination conditions such as tones, brightness, and luminance of illumination devices L1 to L4 connected thereto. The illumination devices L1 to L4 and a video output device 20 are connected to the illumination control apparatus 1.

The illumination devices L1 to L4 are illumination devices that perform illumination, and each of the illumination devices L1 to L4 is provided with a light emitting diode (LED; not illustrated). The illumination control apparatus 1 and the illumination devices L1 to L4 are connected in a wired manner, and specifically, first, the illumination control apparatus 1 and the illumination device L1 are connected in a wired manner, the illumination device L1 and the illumination device L2 are connected in a wired manner, the illumination device L2 and the illumination device L3 are connected in a wired manner, and the illumination device L3 and the illumination device L4 are connected in a wired manner. In other words, the illumination control apparatus 1 and the illumination devices L1 to L4 are connected in a row (daisy chain) in a wired manner.

The illumination control apparatus 1 creates a control signal Si including illumination control values for controlling illumination conditions and transmits the control signal Si to the illumination devices L1 to L4. Specifically, the control signal Si created by the illumination control apparatus 1 is transmitted to the illumination device L1 first, and the control signal Si is then transmitted to the illumination device L2, the illumination device L3, and the illumination device L4 in the order in which they are connected from the illumination device L1. The illumination devices L1 to L4 control tones, colors, brightness, luminance, and the like of LEDs on the basis of the set of illumination control values included in the received control signal Si. Next, an outline of the control signal Si transmitted to the illumination devices L1 to L4 will be described.

The control signal Si is configured by storing sets of illumination control values in a manner that each set of the illumination control values is disposed from a start address that is an address representing a start position defined in advance. Although the control signal Si in the present embodiment is configured on the basis of the Digital MultipleX (DMX) 512 standard, the control signal Si may be configured on the basis of other standards.

Figure 3:
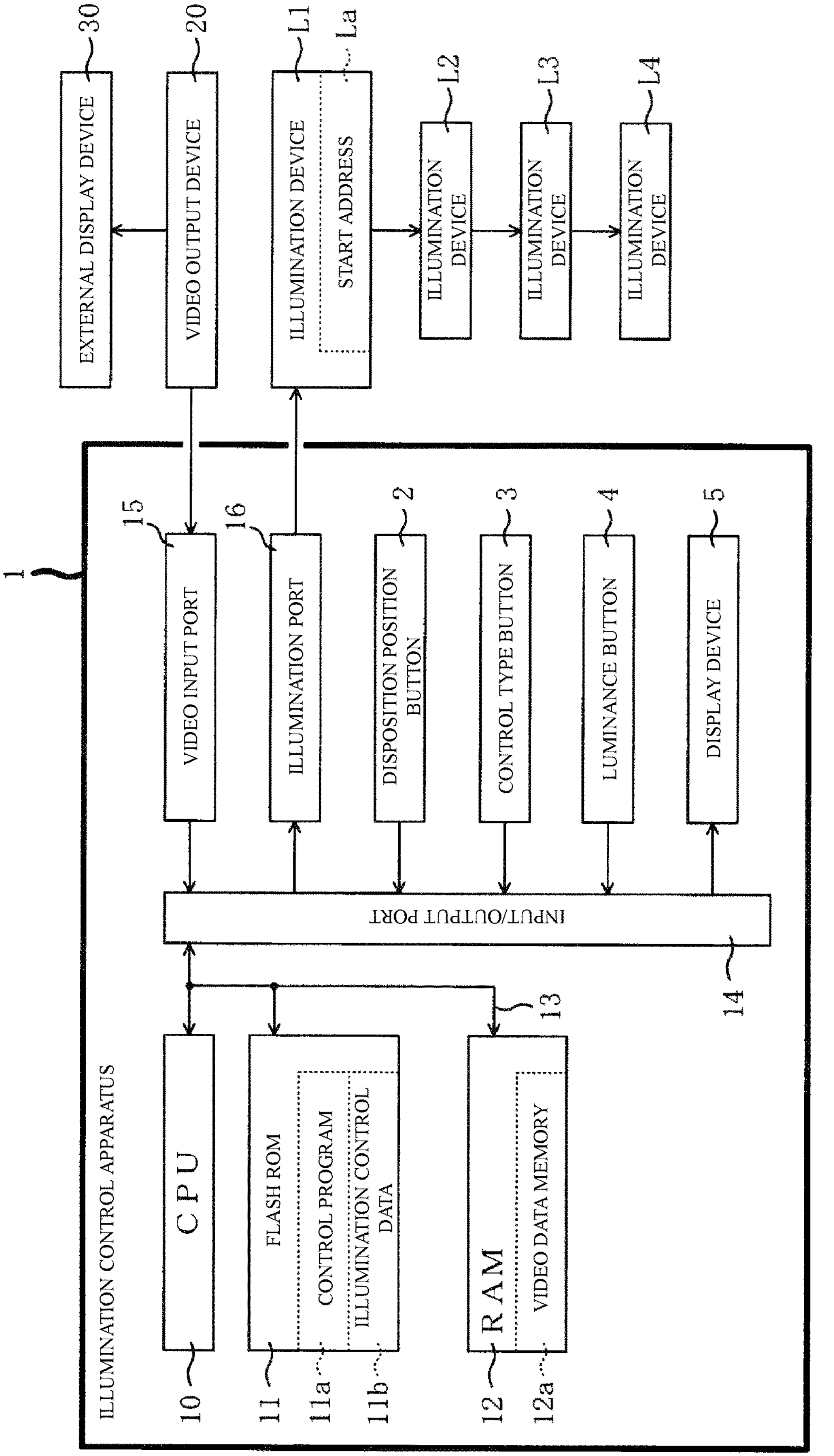
FIG. 3 is a block diagram illustrating an electrical configuration of the illumination control apparatus.

For the illumination devices L1 to L4, a start address of a set of illumination control values used by the illumination devices L1 to L4 themselves from among sets of illumination control values included in the control signal Si is set in advance (specifically, a start address Ls, which will be described later in FIG. 3). The illumination devices L1 to L4 acquire the set of illumination control values at the start address set for the illumination devices L1 to L4 themselves from the control signal Si received from the illumination control apparatus 1 and control a color, brightness, luminance, and the like of the illumination devices L1 to L4 themselves on the basis of the acquired set of illumination control values. The set of illumination control values is created on the basis of video data Ds output from the video output device 20.

The video output device 20 is a device that outputs video data Ds of a video captured by a video camera (not illustrated) or the like. The video data Ds output from the video output device 20 is input to the illumination control apparatus 1 and the external display device 30. The video of the video data Ds output from the video output device 20 is displayed on the external display device 30.

The aforementioned illumination devices L1 to L4 are disposed around the external display device 30. Specifically, the illumination device L1 is provided on the left side of the external display device 30, the illumination device L2 is provided above it, the illumination device L3 is provided on the right side, and the illumination device L4 is provided below it. Hereinafter, "disposition position" means the up-down and left-right position of the external display device 30, and specifically, "disposition position: upper" means the position above the external display device 30, and similarly, "disposition position: lower," "disposition position: left," and "disposition position: right" mean the lower side, the left side, and the right side positions of the external display device 30, respectively.

In the illumination control apparatus 1, sets of the illumination control values for controlling the illumination devices L1 to L4 are created on the basis of the video displayed on the external display device 30, that is, the video data Ds of the video output from the video output device 20. The illumination control apparatus 1 splits the video data Ds of the video output from the video output device 20 into regions A1 to A4.

Specifically, in a case in which the width of the video is defined as W, and the height is defined as H, the region A2 is a region corresponding to the height of the lower H/4 from the upper end of the video, and the region A4 is a region corresponding to the height of the upper H/4 from the lower end of the video. Also, the region A1 is a region on the left side that is sandwiched between the regions A2 and A4, the width thereof is defined as W/2 from the left end of the video, the region A3 is a region on the right side that is sandwiched between the regions A2 and A4, and the width thereof is defined as W/2 from the right end of the video.

The sets of the illumination control values are created on the basis of the video data for each of such divided regions A1 to A4. Also, the sets of the illumination control values created on the basis of the regions A1 to A4 are used to control the illumination devices L1 to L4 at the disposition positions that are adjacent to the regions. In other words, since the region A1 is adjacent to the disposition position:

left, the set of the illumination control values based on the region A1 is used to control the illumination device L1 disposed at the disposition position: left, and similarly, the sets of the illumination control values based on the regions A2, A3, and A4 are used for the illumination devices L2, L3, and L4, respectively.

Such sets of illumination control values are various values depending on the numbers of colors, luminance, or the like that can be controlled by the illumination devices L1 to L4, and an alignment order of control values, that is, control types. Thus, in the present embodiment, the sets of the illumination control values based on a plurality of control types and each region (disposition position) of the video data Ds are created, respectively, the created sets of illumination control values are disposed in accordance with start addresses corresponding to the control types and the disposition positions, and the control signal Si is thereby created.

Then, the operator sets a start address of a set of illumination control values corresponding to "disposition position: left" and the control type of the illumination device L1 for the illumination device L1 and sets start addresses of sets of illumination control values corresponding to the disposition positions and the control types for the illumination devices L2 to L4, respectively, and illumination in accordance with the videos in the regions A1 to A4 that are adjacent to the illumination devices L1 to L4 is output from the illumination devices L1 to L4 disposed around the external display device 30. It is thus possible to improve a sense of realism that a viewer receives from the video of the external display device 30 and a sense of immersion into the video.

Also, the regions A1 to A4 are split in accordance with the disposition positions of the illumination devices L1 to L4. It is thus possible to control the conditions of the illumination of the illumination devices L1 to L4 in accordance with the videos in the regions A1 to A4 without adjusting the disposition positions of the illumination devices L1 to L4 in accordance with the regions A1 to A4.

In order to control illumination with such an illumination control apparatus 1, it is necessary for the operator to set the start address for each of the illumination devices L1 to L4. The illumination control apparatus 1 according to the present embodiment is configured to be able to display a start address corresponding to a disposition position and a control type that are designated. Specifically, the illumination control apparatus 1 is provided with a disposition position button 2, a control type button 3, a luminance button 4, and a display device 5. The disposition position button 2 is a button for switching the disposition position and includes an up button 2*a* for switching "up," "down," and the like of the disposition position in ascending order and a "down" button 2*b* for switching them in descending order.

The control type button 3 is a button for switching the control type and includes an up button 3*a* for switching the control type in ascending order and a down button 3*b* for switching it in descending order. The control type in the present embodiment is configured with a combination of colors and luminance (M). Specifically, colors are a red color component (R), a green color component (G), a blue color component (B), a white color component (W), and an amber color component (A). For example, "RGBM" represents a control type in which the red color component, the green color component, the blue color component, and the luminance can be changed.

The luminance button 4 is a button for setting a value of luminance (M) used as an illumination control value and includes an up button 4*a* for increasing the value of luminance and a down button 4*b* for decreasing the value of luminance.

The display device 5 is a device that outputs a start address in accordance with the disposition position and the control type set by the disposition position button 2 and the control type button 3. The display device 5 displays a disposition position area 5*a* where the disposition position set by the disposition position button 2 is displayed, a control type area 5*b* where the control type set by the control type button 3 is displayed, and an address area 5*c* where the start address corresponding to the disposition position and the control type set by the disposition position button 2 and the control type button 3 is displayed.

Since the start address is stored in illumination control data 11*b* (see FIG. 3) in association with the disposition position and the control type in advance, the start address of the disposition position and the control type designated using the disposition position button 2 and the control type button 3 is acquired from the illumination control data 11*b* and is then displayed in the address area 5*c*. In this manner, the operator sets the start addresses displayed in the address areas 5*c* for the illumination devices L1 to L4, and the illumination devices L1 to L4 can thus control conditions of illumination on the basis of the sets of illumination control values in the control signal Si transmitted from the illumination control apparatus 1. In other words, it is possible to control the illumination devices L1 to L4 using the illumination control apparatus 1 by setting the start addresses for the illumination devices L1 to L4 without setting a start address again for the illumination control apparatus 1. It is thus possible to reduce the operator's time and effort of setting the start addresses.

Figure 2:
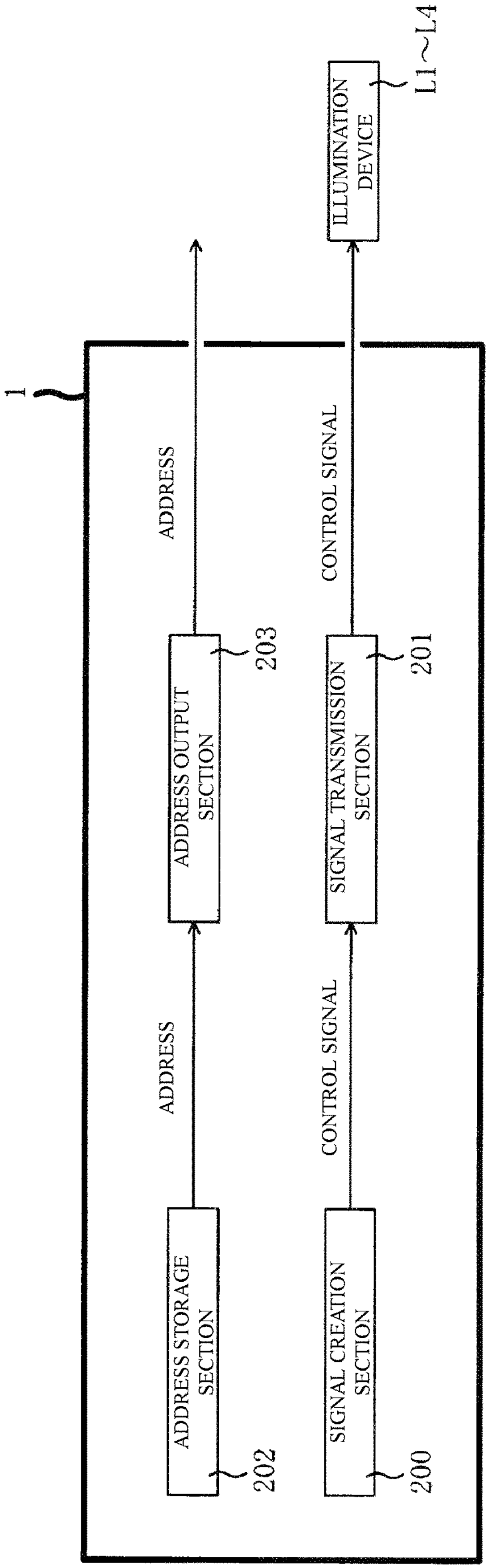
FIG. 2 is a functional block diagram of the illumination control apparatus.

Next, functions of the illumination control apparatus 1 will be described with reference to FIG. 2. FIG. 2 is a functional block diagram of the illumination control apparatus 1. As illustrated in FIG. 2, the illumination control apparatus 1 includes a signal creation section 200, a signal transmission section 201, an address storage section 202, and an address output section 203. The signal creation section 200 is a section adapted to create a control signal Si including a plurality of sets of illumination control values for controlling illumination and is realized by a CPU 11, which will be described later in FIG. 3. The signal transmission section 201 is a section adapted to transmit the control signal Si created by the signal creation section 200 to the plurality of illumination devices L1 to L4 and is realized by the CPU 11.

The address storage section 202 is a section adapted to store addresses of the sets of the illumination control values in the control signal Si created by the signal creation section 200 and is realized by the illumination control data 11*b*, which will be described later in FIG. 3. The address output section 203 is a section adapted to output the addresses stored in the address storage section 202 in a manner that the addresses can be set for the illumination devices L1 to L4 and is realized by the display device 5 described above in FIG. 1.

In the illumination control apparatus 1, the addresses of the sets of illumination control values in the control signal Si are stored in the address storage section 202, and the address output section 203 outputs the addresses in a manner that the addresses can be set for the illumination devices L1 to L4. The illumination devices L1 to L4 are configured to be able to control conditions of illumination on the basis of the sets of illumination control values in the control signal Si transmitted from the illumination control apparatus 1 by causing the illumination devices L1 to L4 to set the addresses. In other words, it is possible to control the illumination devices L1 to L4 using the illumination control apparatus 1 by the operator setting the addresses for the illumination devices L1 to L4 without setting any address for the illumination control apparatus 1. It is thus possible to reduce the operator's time and effort of setting the addresses.

Next, an electrical configuration of the illumination control apparatus 1 will be described with reference to FIGS. 3 and 4. FIG. 3 is a block diagram illustrating an electrical configuration of the illumination control apparatus 1. The illumination control apparatus 1 includes a CPU 10, a flash ROM 11, and a RAM 12, and each of these components is connected to an input/output port 14 via a bus line 13. A video input port 15, an illumination port 16, and the disposition position button 2, the control type button 3, the luminance button 4, and the display device 5 that were described above are further connected to the input/output port 14.

The CPU 10 is an arithmetic operation device that controls each component connected with the bus line 13. The flash ROM 11 is a rewritable non-volatile storage device storing programs executed by the CPU 10, fixed value data, and the like, and a control program 11*a* and the illumination control data 11*b* are stored therein. Main processing in (a) of FIG. 5 is executed by the CPU 10 executing the control program 11*a*. The illumination control data 11*b* will be described with reference to FIG. 4.

FIG. 4 is a diagram schematically illustrating the illumination control data 11*b*. The start addresses (start positions) of the sets of illumination control values for disposition positions and control types, the numbers of bytes of the sets of illumination control values, and illumination control values split into each byte are stored in the illumination control data 11*b*. As "entire" stored as a disposition position in the illumination control data 11*b*, illumination control values based on all video data Ds input from the video output device 20 are stored.

As the illumination control values stored in the illumination control data 11*b*, color information and luminance information are stored for each byte. As illumination control values for the disposition position "entire" and the control type "RGB," for example, "81" that is data of a red color component is stored in the first byte, "216" that is data of a green color component is stored in the second byte, and "154" that is data of a blue color component is stored in the third byte. The illumination control values corresponding to these 3 bytes are regarded as a set of illumination control values for the disposition position "entire" and the control type "RGB."

Description will now return to FIG. 3. The RAM 12 is a memory for storing various kinds of work data, flags, and the like in a rewritable manner when the CPU 10 executes the control program 11*a* and includes a video data memory 12*a* in which the video data Ds is stored. The video input port 15 is a terminal connected to the video output device 20 and adapted to input the video data Ds from the video output device 20.

The illumination port 16 is a terminal connected to the illumination devices L1 to L4 and adapted to output the control signal Si to the illumination devices L1 to L4. The illumination devices L1 to L4 are provided with a start address La in which the start addresses set by the operator via an operating element, which is not illustrated, are stored (not illustrated in the illumination devices L2 to L4). The illumination devices L1 to L4 acquire sets of illumination control values at the start addresses stored in the start address La in the control signal Si received from the illumination control apparatus 1 and control the illumination devices L1 to L4 themselves using the acquired sets of illumination control values.

Next, main processing executed by the CPU 10 in the illumination control apparatus 1 will be described with reference to FIGS. 5 and 6. (a) of FIG. 5 is a flowchart of the main processing. The main processing is processing executed when the power of the illumination control apparatus 1 is turned on. In the main processing, the illumination control values in the illumination control data 11*b* are cleared and initialized first, and an initial value of the disposition position and an initial value of the control type used to acquire the start addresses in processing in S15 in address output processing ((b) of FIG. 5), which will be described later, are set to "entire" and "RGB," respectively (S1). After the processing in S1, the address output processing (S2) is executed, and control value setting processing (S3) is then executed after the address output processing.

Here, the address output processing and the control value setting processing will be described with reference to (b) of FIGS. 5 and 6. (b) of FIG. 5 is a flowchart of the address output processing. In the address output processing, whether or not a disposition position has been set through an operation of the disposition position button 2 is checked first (S10). The set disposition position is acquired (S11) in a case in which a disposition position has been set in the processing in S10 (S10: Yes), or the processing in S11 is skipped in a case in which the disposition position has not been set (S10: No).

After the processing in S10 and S11, whether or not a control type has been set through an operation of the control type button 3 is checked (S12), and the set control type is acquired (S13) in a case in which a control type has been set (S12: Yes), or the processing in S13 is skipped in a case in which the control type has not been set (S12: No).

After the processing in S12 and S13, whether or not at least one of the disposition position and the control type has been acquired in the processing in S11 or S13 is checked (S14). In a case in which at least one of the disposition position and the control type has been acquired in the processing in S14 (S14: Yes), a start address corresponding to the acquired disposition position and the control type is acquired from the illumination control data 11*b* (S15).

At this time, in a case in which a disposition position is acquired in the processing in S11 while no control type is acquired in the processing in S13, a start address corresponding to the acquired disposition position and a control type acquired in the processing in S13 in or before the previous processing is acquired. Similarly, in a case in which a control type is acquired in the processing in S13 while a disposition position is acquired in the processing in S11, a start address corresponding to the acquired control type and a disposition position acquired in the processing in S11 in or before the previous processing is acquired. Note that, in a case in which the processing in S11 or S13 is not executed at all until the processing in S15 is executed after the power of the illumination control apparatus 1 is turned on, a start address is acquired using the initial value "RGB" of the control type or the initial value "entire" of the disposition position set in the processing in Si in (a) of FIG. 5.

After the processing in S15, the acquired start address is displayed on the display device 5 (S16). In this manner, start addresses corresponding to the disposition positions and the control types of the illumination devices L1 to L4 are specified and displayed on the display device 5 from among the start addresses stored in the illumination control data 11*b* through the operations performed by the operator on the disposition position button 2 and the control type button 3. In this manner, the operator can check the start addresses in accordance with the illumination devices L1 to L4 for which setting is to be performed at a glance, and it is thus possible to further reduce the operator's time and effort of setting the start addresses.

In a case in which neither the disposition position nor the control type is acquired in the processing in S14 (S14: No), or after the processing in S16, the address output processing is ended.

Next, the control value setting processing will be described with reference to FIG. 6. FIG. 6 is a flowchart of the control value setting processing. In the control value setting processing, whether video data Ds has been input from the video input port 15 is checked first (S20). In a case in which the video data Ds is input in the processing in S20 (S20: Yes), the input video data Ds is saved in the video data memory 12*a* (S21).

After the processing in S21, zero is set as a counter variable N (S22). The counter variable N is a value for distinguishing the disposition position, and hereinafter, the disposition position will be referred to as a "disposition position N". Specifically, the disposition position N represents "disposition position: entire" when N is zero, represents "disposition position: up" when N is one, represents "disposition position: down" when N is two, represents "disposition position: left" when N is three, and represents "disposition position: right" when N is four.

After the processing in S22, video data in a region that is adjacent to the disposition position N is acquired from the video data memory 12*a*, and average values of the red color component (R), the green color component (G), and the blue color component (B) in all pixels in the acquired video data are calculated (S23).

In the case in which N is zero, that is, in the case of "disposition position: entire", for example, the video data Ds corresponding to the entire region in the video data memory 12*a* is acquired, and average values of the red color component, the green color component, and the blue color component of all the pixels in the acquired video data Ds are calculated. Also, in the case in which N is three, that is, in the case of "disposition position: left", video data corresponding to a region A1 corresponding to the disposition position: left is acquired from the video data memory 12*a*, and average values of the red color component, the green color component, and the blue color component of all the pixels in the acquired video data are calculated.

After the processing in S23, a value of luminance (M) set by the luminance button 4 (see FIG. 1) is acquired (S24). After the processing in S24, the amber color component (A) is calculated from the average values of the red color component and the green color component calculated in the processing in S23 (S25). Specifically, a value obtained by dividing a value obtained by adding the average value of the red color component and the average value of the green color component by two is defined as the amber color component. Note that the scheme of calculating the amber color component is not limited thereto, and the amber color component may be calculated by dividing a square root of a value obtained by adding a square of the average value of the red color component and a square of the average value of the green color component by a square root of two, for example.

After the processing in S25, a white color component (W) is calculated from the average values of the red color component, the green color component, and the blue color component calculated in the processing in S23 (S26). Specifically, a value obtained by dividing a value obtained by adding the average value of the red color component, the average value of the green color component, and the average value of the blue color component by three is defined as the white color component. Note that the scheme of calculating the white color component is not limited thereto, and for example, the white color component may be calculated by dividing a square root of a value obtained by adding a square of the average value of the red color component, the square of the average value of the green color component, and a square of the average value of the blue color component by a square root of three.

After the processing in S26, the average values of the red color component, the green color component, and the blue color component calculated in the processing in S23, the luminance acquired in the processing in S24, the amber color component calculated in the processing in S25, and the white color component calculated in the processing in S26 are saved as illumination control values at the disposition position N in the illumination control data 11*b* (S27).

In the illumination control data 11*b* in FIG. 4, for example, the illumination control values in the "disposition position: entire" is the red color component (R) in the first byte of the control type "RGB", the first byte in the control type "RGBM", the second byte in the control type "MRGB", the first byte in the control type "RGBAM", and the second byte in the control type "WRGB", and the average value of the red color component calculated in the processing in S23 is saved at the positions corresponding thereto. The other values such as an average value of the green color component are also similarly saved in the illumination control data 11*b*.

After the processing in S27, one is added to the counter variable N (S28), and whether or not the counter variable N is greater than four is checked (S29). In a case in which the counter variable N is equal to or less than four in the processing in S29 (S29: No), it means that there are regions A1 to A4 on which the processing in S23 to S27 has not yet been performed, and the processing in and after S23 is thus repeated.

In a case in which the video data Ds is not input in the processing in S20 (S20: No) or in a case in which the counter variable N is greater than four in the processing in S29 (S29: Yes), the control value setting processing is ended.

The description will be returned to (a) of FIG. 5. After the control value setting processing in S3, whether or not there has been a change in illumination control values in the illumination control data 11*b* before or after the control value setting processing is executed is checked (S4). In a case in which there has been a change in illumination control values in the illumination control data 11*b* in the processing in S4 (S4: Yes), the control signal Si is created from the illumination control values in the illumination control data 11*b* (S5). Specifically, the control signal Si is created by connecting the illumination control values stored in the illumination control data 11*b* from the top to the end, that is, the "disposition position: entire" and from the first byte of the "control type: RGB" to the fourth byte of the "disposition position: right" and the "control type: WRGB" in order. In this manner, sets of all the illumination control values stored in the illumination control data 11*b* are stored in the control signal Si.

In the illumination control apparatus 1, the control signal Si based on the video data Ds is created and is then transmitted to the illumination devices L1 to L4 in accordance with the start addresses in the illumination control data 11*b*. Since a plurality of start addresses is stored in the illumination control data 11*b* for each combination of a disposition position and a control type in advance, sets of illumination control values corresponding to the plurality of combinations of disposition positions and control types are stored in the control signal Si by creating the control signal Si in accordance with such start addresses. The illumination control apparatus 1 can thus control conditions of illumination of the illumination devices L1 to L4 regardless of the disposition positions and the control types of the illumination devices L1 to L4 that are actually connected, or the condition regarding the number of illumination devices.

After the processing in S5, the created control signal Si is transmitted from the illumination port to the illumination devices L1 to L4 (S6). In a case in which there has been no change in illumination control values in the illumination control data 11*b* in the processing in S4 (S4: No), or after the processing in S6, the processing in and after S2 is repeated.

Next, a second embodiment will be described with reference to FIGS. 7 to 9. In the illumination control apparatus 1 according to the aforementioned first embodiment, the start addresses corresponding to the disposition positions and the control type acquired using the disposition position button 2 and the control type button 3 are displayed on the display device 5. On the other hand, in an illumination control apparatus 100 according to the second embodiment, disposition positions and control types are acquired from the illumination devices L1 to L4, and start addresses corresponding to the acquired disposition positions and the control types are displayed on the display device 5. The same reference signs will be applied to the same components as those in the first embodiment, and description thereof will be omitted.

FIG. 7 is an exterior view of the illumination control apparatus 100 according to the second embodiment. The illumination devices L1 to L4 according to the second embodiment are configured to be able to set and transmit the disposition positions and the control types thereof. The illumination control apparatus 100 acquires, from the illumination control data 11*b*, start addresses corresponding to the disposition positions and the control types received from the illumination devices L1 to L4 and displays the start addresses in the address area 5*c* in the display device 5. Therefore, the disposition position button 2 and the control type button 3 in the illumination control apparatus 1 according to the first embodiment are omitted from the illumination control apparatus 100.

Next, an electrical configuration of the illumination control apparatus 100 according to the second embodiment will be described with reference to FIG. 8. FIG. 8 is a block diagram illustrating the electrical configuration of the illumination control apparatus 100 according to the second embodiment. An illumination port 16 of the illumination control apparatus 100 is configured to be able to perform transmission and reception, and specifically, the illumination port 16 transmits the control signal Si to the illumination devices L1 to L4 and receives the disposition positions and the control types from the illumination devices L1 to L4. In other words, the illumination port 16 and the illumination devices L1 to L4 are configured to be able to perform bidirectional communication.

Also, the illumination devices L1 to L4 are provided with a disposition position Lb where the disposition position is stored and a control type Lc where the control type is stored, along with a start address La. In the illumination devices L1 to L4, the disposition position and the control type set by an operator using operating elements, which are not illustrated, are stored in the disposition position Lb and the control type Lc. The disposition position and the control type stored in the disposition position Lb and the control type Lc are transmitted to the illumination control apparatus 100 via the illumination port 16.

Next, address output processing according to the second embodiment will be described with reference to FIG. 9. FIG. 9 is a flowchart of the address output processing. In the address output processing according to the second embodiment, whether or not the disposition positions and the control types of the illumination devices L1 to L4 have been received from the illumination port 16 is checked first (S100).

In a case in which the disposition positions and the control types are received in the processing in S100 (S100: Yes), the start addresses corresponding to the received disposition positions and the control types are acquired from the illumination control data 11*b* (S101). After the processing in S101, the start addresses acquired in the processing in S101 are displayed on the display device 5 in order (S16). In a case in which the disposition positions and the control types are not received in the processing in S100 (S100: No), or after the processing in S16, the address output processing is ended.

As described above, in the illumination control apparatus 100 according to the second embodiment, the start addresses corresponding to the disposition positions and the control types received from the connected illumination devices L1 to L4 are output to the display device 5. In other words, since the start addresses corresponding to the disposition positions and the control types of the connected illumination devices L1 to L4 are automatically displayed, the operator can check the start addresses without performing any special operation on the illumination control apparatus 100. It is thus possible to further reduce operator's time and efforts of setting the start addresses.

Although the aforementioned description has been given on the basis of the embodiments, it is possible to easily presume that various improvements and modifications can be made.

Although the illumination control apparatuses 1 and 100 are adapted to control illumination of the illumination devices L1 to L4 disposed around the external display device 30 in the aforementioned embodiments, the present disclosure is not limited thereto. The illumination devices L1 to L4 may be disposed on an indoor ceiling, a floor, or a wall, for example, regardless of the external display device 30, and the illumination of the illumination devices L1 to L4 may be controlled by the illumination control apparatuses 1 and 100 without any correlation with the video displayed on the external display device 30. In this case, it is only necessary to appropriately set the positions where the illumination devices L1 to L4 are disposed, such as a "ceiling", a "floor", a "wall (front-back, left-right)", or the like in the illumination control data 11*b* (see FIG. 4) instead of "up, down, left, right" as the disposition positions, and it is only necessary to calculate illumination control values in accordance with these disposition positions and to store the illumination control values in the illumination control data 11*b* in the control value setting processing (see FIG. 6).

Although the video in the video data Ds is split into four regions, namely the regions A1 to A4 and the set of the illumination control values in each region is calculated in the aforementioned embodiments, the number of regions to be split may be equal to or less than four or equal to or greater than four. For example, sets of illumination control values may be calculated from sixteen regions A1 to A16 obtained by vertically and horizontally splitting the video into four parts, respectively, as illustrated in (a) of FIG. 10. In this case, a group including a plurality of regions may be formed, and a set of illumination control values at a nearby disposition position may be calculated on the basis of the group.

For example, it is only necessary to calculate a set of illumination control values for the disposition position: left on the basis of the regions A5 and A9, to calculate a set of illumination control values for the disposition position: up on the basis of the regions A1 to A4, A6, and A7, to calculate a set of illumination control values for the disposition position: right on the basis of the regions A8 and A12, and to calculate a set of illumination control values for the disposition position: up on the basis of the regions A10, A11, and A13 to A16.

Also, a single region may be used in an overlapping manner in the calculation of sets of illumination control values for a plurality of disposition positions. For example, the region A1 may be used in an overlapping manner for calculation of sets of illumination control values for the disposition position: left and the disposition position: up by calculating a set of illumination control values for the disposition position: left on the basis of the regions A1, A5, A9, and A13 and calculating a set of illumination control values for the disposition position: up on the basis of the regions A1 to A4.

Moreover, there may be regions that are not used in the calculation of sets of illumination control values for any disposition position. For example, a set of illumination control values for the disposition position: left may be calculated using the regions A5 and A9, a set of illumination control values for the disposition position: up may be calculated using the regions A1 to A4, a set of illumination control values for the disposition position: right may be calculated using the regions A8 and A12, and a set of illumination control values for the disposition position: down may be calculated using the regions A13 to A16, while the regions A6, A7, A10, and A11 may not be used to calculate the illumination control values.

Also, although the disposition positions are assumed to include four disposition positions, namely up, down, left, and right and the number of regions corresponding thereto is also assumed to be four, the present disclosure is not limited thereto, and for example, eight disposition positions, namely upper left, upper center, upper right, right center, lower right, lower center, lower left, and the left center may be provided, and the number of the corresponding regions may be eight. The disposition positions and the regions may be split in an arbitrary way as long as the disposition positions and the regions correspond to each other.

The disposition positions and the control types set through operations performed on the disposition position button 2 and the control type button 3 are acquired in the first embodiment, and the disposition positions and the control types are acquired from the illumination devices L1 to L4 in the second embodiment. The present disclosure is not limited thereto. The disposition positions set through an operation of the disposition position button 2 may be acquired, and the control types may be acquired from the illumination devices L1 to L4. On the contrary, the control types set through an operation of the control type button 3 may be acquired, and the disposition positions may be acquired from the illumination devices L1 to L4.

For example, in a case in which the disposition positions set through an operation of the disposition position button 2 are acquired, and the control types are acquired from the illumination devices L1 to L4, whether or not the control types of the illumination devices L1 to L4 have been received from the illumination port 16 or whether or not the disposition positions have been set through an operation on the disposition position button 2 is checked first (S200) as in the address output processing in (b) of FIG. 10. In a case in which the control types have been received or the disposition positions have been set in the processing in S200 (S200: Yes), start addresses corresponding to the control types received from the illumination port 16 and the disposition positions set by the disposition position button 2 are acquired from the illumination control data 11*b* (S201), and the acquired start addresses may be displayed in order on the display devices 5 (S16).

Although the start addresses acquired from the illumination control data 11*b* are displayed on the display device 5 in the aforementioned embodiments, the acquired start addresses may be output as audio, or the acquired start addresses may be transmitted to the operator through an e-mail, a short message service (SMS), or the like. Also, a printing function may be mounted in the illumination control apparatuses 1 and 100, and the acquired start addresses may be printed on paper.

Also, all disposition positions and control types and start addresses corresponding thereto, which are stored in the illumination control data 11*b*, may be printed on paper in advance, and the operator may set the start addresses for the illumination devices L1 to L4 while viewing the paper. In this case, the address output section such as display of the start addresses on the display device 5 may be omitted.

Moreover, the start addresses corresponding to the disposition positions and the control types acquired from the illumination devices L1 to L4 are acquired from the illumination control data 11*b* and are displayed on the display device 5 in the second embodiment. The present disclosure is not limited thereto, and for example, the start addresses acquired from the illumination control data 11*b* may be transmitted to the illumination devices L1 to L4 via the illumination port 16, and the illumination devices L1 to L4 may set the corresponding start addresses as their own start addresses from among the received start addresses.

In the aforementioned embodiments, the illumination devices L1 to L4 are connected to the illumination control apparatuses 1 and 100 in a wired manner via the illumination port 16, and the control signal Si is transmitted. However, the present disclosure is not limited thereto, and for example, the illumination control apparatuses 1 and 100 and the illumination devices L1 to L4 may be connected through a wired LAN, and the control signal Si may be transmitted via the wired LAN. In this case, although an Art-Net is exemplified as a communication protocol for transmitting the control signal Si through the wired LAN, another communication protocol may be employed. Also, the illumination control apparatuses 1 and 100 and the illumination devices L1 to L4 may be connected through wireless communication (Bluetooth (registered trademark), for example), and the control signal Si may be transmitted via the wireless communication.

Although the four illumination devices, namely the illumination devices L1 to L4 are connected to the illumination control apparatuses 1 and 100 in the aforementioned embodiments, the number of illumination devices connected may be equal to or less than four or equal to or greater than four. Also, a plurality of illumination devices L1 to L4 may be disposed at each disposition position. In this case, the same start addresses may be set for the illumination devices L1 to L4 of the same control type disposed at the same disposition position. Moreover, the number of illumination devices L1 to L4 disposed at each disposition position may not necessarily be the same, and for example, disposition positions where the plurality of illumination devices L1 to L4 is disposed and disposition positions where no illumination devices L1 to L4 are disposed may be present in a mixed manner.

Although a single illumination control apparatus 1 or 100 is connected to the illumination devices L1 to L4 in the aforementioned embodiments, a plurality of illumination control apparatuses 1 or 100 may be connected to the illumination devices L1 to L4.

Although all pixels in the video data in the corresponding regions are acquired from the video data memory 12*a*, and average values of the red color component, the green color component, and the blue color component are calculated in the calculation of the illumination control values in the processing in S23 in FIG. 6 in the aforementioned embodiments, the average values of the red color component and the like may be calculated by thinning out some pixels in the video data by skipping every other pixel in the video data, for example.

Moreover, an average value of pixels in a specific period of time (for five seconds, for example) in the video data in the corresponding region, and the average values of the red color component and the like may be calculated from the calculated average value of the pixels, or pixels with small changes in color (or pixels with large changes in color) in a specific period of time may be acquired, and the average values of the red color component and the like may be calculated. Also, although the calculation of the illumination control values in the processing in and after S22 and the creation and the transmission of the control signal Si in the processing in S4 to S6 in (a) of FIG. 5 are performed every time the video data Ds is input from the video input port 15 in the processing in S20 in FIG. 6, the present disclosure is not limited thereto, and the processing may be performed at a specific time cycle, for example.

Also, the illumination control values are not limited to those created from the video data in the video data memory 12*a*, and for example, conditions of illumination to be output may be stored in a chronological order, illumination control values to achieve the stored conditions of illumination may be calculated and stored in the illumination control data 11*b*. Also, the illumination control apparatuses 1 and 100 may be provided with an operating element for setting conditions of illumination, and illumination control values to achieve conditions of illumination set by the operator using the operating element may be calculated and stored in the illumination control data 11*b*.

Although the device that outputs the video data Ds of the video captured by a video camera or the like has been exemplified as the video output device 20 in the aforementioned embodiments, the present disclosure is not limited thereto. For example, the video output device 20 may be configured with a DVD player, and video data Ds of a video recorded in a DVD or the like may be output. Alternatively, the video output device 20 may be configured with a TV tuner, and video data Ds of received TV broadcasting may be output. Also, the video output device 20 may be configured to be able to be connected to the Internet, and video data Ds such as a live video acquired via the Internet may be output.

Although the illumination control apparatuses 1 and 100 with the control program 11*a* incorporated therein have been exemplified in the aforementioned embodiments, the present disclosure is not limited thereto, and a configuration in which an information processing apparatus (computer) such as a personal computer executes the control program 11*a* may be employed.

The numerical values described in the aforementioned embodiments are only examples, and it is a matter of course that other numerical values can be employed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An illumination control apparatus including a signal creation section that creates a control signal including a plurality of sets of illumination control values for controlling illumination and a signal transmission section that transmits the control signal created by the signal creation section to one or a plurality of illumination devices, the illumination control apparatus comprising:

a start position storage section that stores start positions of the sets of illumination control values in the control signal created by the signal creation section; and a start position output section that outputs the start positions stored in the start position storage section in a manner that the start positions can be set for the illumination devices, wherein the illumination devices are configured to be able to control conditions of the illumination on the basis of the sets of illumination control values in the control signal transmitted by the signal transmission section by setting the start positions output by the start position output section for the illumination devices.

2. The illumination control apparatus according to claim 1, wherein the start position storage section stores the start positions in association with disposition positions of the illumination devices.

3. The illumination control apparatus according to claim 2, further comprising:

a disposition input section that inputs the disposition positions of the illumination devices, wherein the start position output section outputs start positions corresponding to the disposition positions input by the disposition input section from among the start positions stored in the start position storage section.

4. The illumination control apparatus according to claim 2, further comprising:

a disposition acquisition section that acquires the disposition positions of the illumination devices from the illumination devices, wherein the start position output section outputs start positions corresponding to the disposition positions acquired by the disposition acquisition section from among the start positions stored in the start position storage section.

5. The illumination control apparatus according to claim 2, wherein the start position storage section stores the start positions in association with control types, which are types of illumination control values corresponding to the start positions.

6. The illumination control apparatus according to claim 2, wherein the start position storage section stores the start positions for each of combinations of disposition positions of the illumination devices and control types which are types of the illumination control values.

7. The illumination control apparatus according to claim 1, wherein the start position storage section stores the start positions in association with control types, which are types of the illumination control values corresponding to the start positions.

8. The illumination control apparatus according to claim 7, further comprising
- a type input section that inputs the control types,
- wherein the start position output section outputs start positions corresponding to the control types input by the type input section from among the start positions stored in the start position storage section.

9. The illumination control apparatus according to claim 7, further comprising:
- a type acquisition section that acquires, from the illumination devices, control types of illumination control values used in the illumination devices,
- wherein the start position output section outputs start positions corresponding to the control types acquired by the type acquisition section from among the start positions stored in the start position storage section.

10. The illumination control apparatus according to claim 7, wherein the start position storage section stores the start positions for each of combinations of the disposition positions of the illumination devices and control types which are types of the illumination control values.

11. The illumination control apparatus according to claim 1,
- the illumination control apparatus further comprises a video acquisition section that acquires a video to be displayed on the external display device, and
- the signal creation section creates the illumination control values on the basis of video data of the video acquired by the video acquisition section and creates the control signal from the created illumination control values.

12. The illumination control apparatus according to claim 11, wherein the plurality of illumination devices to which the control signal is transmitted by the signal transmission section is disposed around an external display device,
- wherein the start position storage section stores the start positions in association with disposition positions of the illumination devices.

13. The illumination control apparatus according to claim 11, wherein the start position storage section stores the start positions in association with control types, which are types of illumination control values corresponding to the start positions.

14. The illumination control apparatus according to claim 11, further comprising:
- a splitting section that splits the video acquired by the video acquisition section into predetermined regions,
- wherein the signal creation section creates the illumination control values on the basis of the video data of the video in each of the regions split by the splitting section and creates the control signal from the created illumination control values in each of the regions.

15. The illumination control apparatus according to claim 14, wherein the splitting section splits the video acquired by the video acquisition section into regions in accordance with the disposition positions of the illumination devices.

16. A computer readable recording medium that records an illumination control program for causing a computer including a storage section to execute illumination control processing, the illumination control program causing the computer to execute a signal creating step of creating a control signal including a plurality of sets of illumination control values for controlling illumination and a signal transmitting step of transmitting the control signal created in the signal creating step to a plurality of illumination devices, the illumination control program being configured to:
- cause the storage section to function as a start position storage section that stores start positions of the sets of illumination control values in the control signal created in the signal creating step; and
- cause the computer to execute a start position outputting step of the start positions stored in the start position storage section in a manner that the start positions are able to be set for the illumination devices,
- wherein the illumination devices are configured to be able to control conditions of the illumination on the basis of the illumination control values in the control signals transmitted in the signal transmitting step by causing the illumination devices to set the start positions output in the start position outputting step.

17. An illumination control method comprising:
- creating a control signal including a plurality of sets of illumination control values for controlling illumination; and
- transmitting the created control signal to one or a plurality of illumination devices,
- wherein start positions of the sets of illumination control values in the created control signal are determined in advance in association with control types, which are types of the illumination control values.

18. The illumination control method according to claim 17, wherein the start positions of the sets of illumination control values in the created control signal are determined in advance in association with disposition positions of the illumination devices.

19. The illumination control method according to claim 17, wherein the start positions of the sets of illumination control values in the created control signal are determined in advance for each of combinations of disposition positions of the illumination devices and control types which are types of the illumination control values.

* * * * *